(12) United States Patent
Wagatsuma

(10) Patent No.: US 10,778,873 B2
(45) Date of Patent: Sep. 15, 2020

(54) IMAGE FORMING SYSTEM, PRINT JOB PROCESSING METHOD, AND SERVER FOR RELIABLE COLOR REPRODUCTION

(71) Applicant: KONICA MINOLTA, INC., Tokyo (JP)

(72) Inventor: Yoshifumi Wagatsuma, Kunitachi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/996,857

(22) Filed: Jun. 4, 2018

(65) Prior Publication Data
US 2018/0367703 A1    Dec. 20, 2018

(30) Foreign Application Priority Data

Jun. 20, 2017 (JP) .................................. 2017-120754

(51) Int. Cl.
*H04N 1/60* (2006.01)
*G06F 3/12* (2006.01)

(52) U.S. Cl.
CPC ........... *H04N 1/605* (2013.01); *G06F 3/1208* (2013.01); *G06F 3/1256* (2013.01); *G06F 3/1259* (2013.01); *G06F 3/1288* (2013.01); *H04N 1/603* (2013.01); *H04N 1/6033* (2013.01)

(58) Field of Classification Search
None
See application file for complete search history.

(56) References Cited

U.S. PATENT DOCUMENTS 6,048,117 A * 4/2000 Banton .............. H04N 1/00002
400/120.09
6,452,692 B1 * 9/2002 Yacoub ................. G06F 3/1204
358/1.13

(Continued)

FOREIGN PATENT DOCUMENTS

| CN | 105376454 A | 3/2016 |
| CN | 105988750 A | 10/2016 |
| JP | 2006-155101 A | 6/2006 |

OTHER PUBLICATIONS

First Office Action issued by The State Intellectual Property Office of People's Republic of China in corresponding Chinese Patent Application No. 201810631236.3 dated Jul. 25, 2019 (19 pages including partial English translation).

(Continued)

*Primary Examiner* — Lennin R Rodriguezgonzalez
(74) *Attorney, Agent, or Firm* — Buchanan Ingersoll & Rooney PC

(57) ABSTRACT

An image forming system according to the present invention includes a server 20 that causes a plurality of image forming apparatuses to execute a print job, and a plurality of image forming apparatuses 30a to 30d that are connected to the server via a network 40 and that receive the print job from the server. The image forming apparatuses forms a test image in accordance with test image data, generates test information relating to the test image that has been formed, and transmits the test information to the server. The server receives the test information from the image forming apparatuses, and determines image forming apparatuses that are to be caused to execute the print job in accordance with the test information.

21 Claims, 9 Drawing Sheets

(56) References Cited

U.S. PATENT DOCUMENTS

| | | | |
|---|---|---|---|
| 2013/0135628 A1* | 5/2013 | Kuno | B41J 3/4073 |
| | | | 358/1.2 |
| 2015/0317107 A1* | 11/2015 | Kikuchi | G06F 3/1267 |
| | | | 358/1.15 |
| 2016/0054694 A1 | 2/2016 | Ikuta | |
| 2016/0216920 A1* | 7/2016 | Zakharov | G06F 3/1236 |
| 2016/0277614 A1* | 9/2016 | Fukunaga | H04N 1/00795 |

OTHER PUBLICATIONS

Second Office Action issued by The State Intellectual Property Office of People's Republic of China in corresponding Chinese Patent Application No. 20181063126.3 dated Apr. 10, 2020 with English Translation (19 pages).

* cited by examiner

IMAGE FORMING SYSTEM, PRINT JOB PROCESSING METHOD, AND SERVER FOR RELIABLE COLOR REPRODUCTION

CROSS-REFERENCE TO RELATED APPLICATION

The entire disclosure of Japanese patent application No. 2017-120754 filed on Jun. 20, 2017, is incorporated herein by reference in its entirety.

BACKGROUND

1. Technological Field

The present invention relates to an image forming system, a print job processing method, and a server.

2. Description of the Related Art

Distributed print processing for causing a plurality of image forming apparatuses to distributedly execute a single print job has been known. In the commercial and industrial printing field, it is requested that each of the plurality of image forming apparatuses that perform distributed print processing have a high color reproducibility with respect to the original.

In relation to the above, Unexamined Japanese Patent Publication No. 2006-155101 discloses a technique in which, when performing distributed print processing, hue information is acquired from each image forming apparatus and the color data of a print job that is to be input to each of the image forming apparatuses is corrected. By employing this technique, the color reproducibility of printed matter obtained by performing distributed print processing can be improved.

However, in the technique described above, the color reproducibility of the printed matter obtained by performing distributed print processing does not always satisfy a desired quality. In the commercial and industrial printing field, it is requested that the color reproducibility of printed matter reliably satisfy a desired quality.

SUMMARY

Meanwhile, when an operator performs color calibration on each image forming apparatus before performing distributed print processing, printed matter for which color reproducibility reliably satisfies the desired quality can be obtained.

However, it takes time to perform a task of color calibration on each of the image forming apparatuses. If the operator performs color calibration on each of the image forming apparatuses every time the print job is executed, printed matter for which color reproducibility satisfies the desired quality is reliably obtained, but it is not preferable that the productivity of each of the image forming apparatuses is reduced.

The present invention has been made in view of the problems described above. Accordingly, it is an object of the present invention to provide an image forming system that achieves both a high color reproducibility and a high productivity when the print job is executed by a plurality of image forming apparatuses.

It is another object of the present invention to provide a print job processing method and a server that implement an image forming system that has both the high color reproducibility and the high productivity.

To achieve at least one of the abovementioned objects, according to an aspect of the present invention, an image forming system reflecting one aspect of the present invention comprises a server that causes a plurality of image forming apparatuses to execute a print job; and a plurality of image forming apparatuses that are connected to the server via a network and that receive the print job from the server, wherein the image forming apparatus forms a test image in accordance with test image data, generates test information relating to the formed test image, and transmits the test information to the server, and the server receives the test information from the image forming apparatus, and determines image forming apparatuses that are to be caused to execute the print job in accordance with the test information.

To achieve at least one of the abovementioned objects, according to an aspect of the present invention, a print job processing method reflecting one aspect of the present invention, which is applied to an image forming system that includes a server that causes a plurality of image forming apparatuses to execute a print job, and a plurality of image forming apparatuses that are connected to the server via a network and that receive the print job from the server, the print job processing method comprises, (a) forming, by the image forming apparatuses, a test image in accordance with test image data, generating test information relating to the formed test image, and transmitting the test information to the server; and (b) receiving, by the server, the test information from the image forming apparatuses, and determining image forming apparatuses that are to be caused to execute the print job in accordance with the test information.

To achieve at least one of the abovementioned objects, according to an aspect of the present invention, a server reflecting one aspect of the present invention, which is used in an image forming system that includes the server that causes a plurality of image forming apparatuses to execute a print job, and a plurality of image forming apparatuses that are connected to the server via a network and that receive the print job from the server, wherein the image forming apparatuses forms a test image in accordance with test image data, generates test information relating to the formed test image, and transmits the test information to the server, and the server receives the test information from the image forming apparatuses, and determines image forming apparatuses that are to be caused to execute the print job in accordance with the test information.

The objects, features, and characteristics of this invention other than those set forth above will become apparent from the description given herein below with reference to preferred embodiments illustrated in the accompanying drawings.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
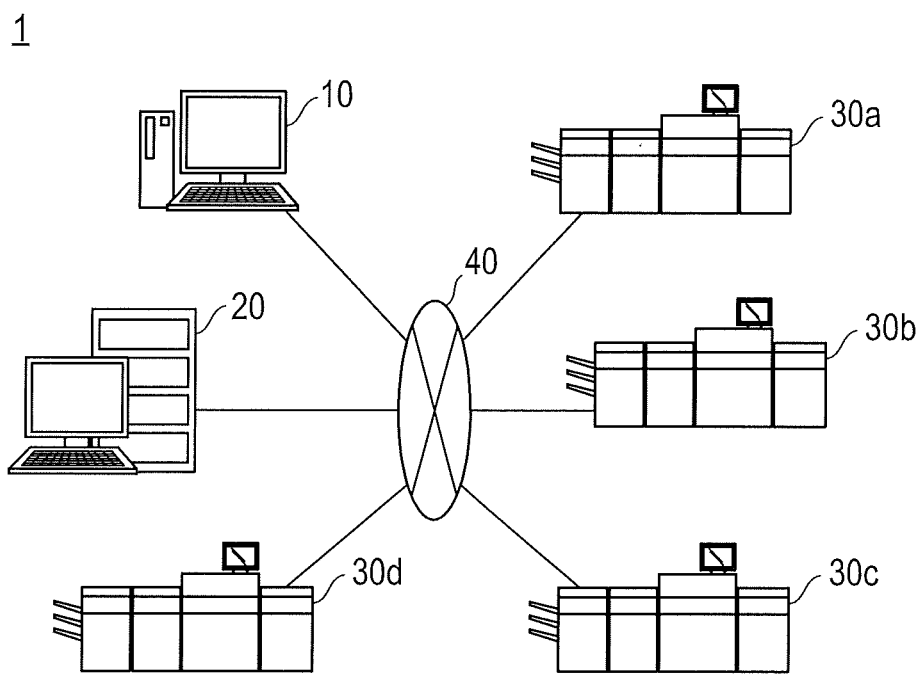
FIG. 1 is a diagram schematically illustrating the configuration of an image forming system according to a first embodiment of the present invention.

FIG. 1 is a diagram schematically illustrating the configuration of an image forming system 1 according to a first embodiment of the present invention. The image forming system 1 includes a client terminal 10, a central management server 20, and a plurality of image forming apparatuses 30a to 30d (hereinafter also collectively referred to as image forming apparatuses 30). The client terminal 10, the central management server 20, and the plurality of image forming apparatuses 30a to 30d are communicably connected to each other via a network 40 such as the Internet. The image forming apparatuses 30a to 30d according to this embodiment are respectively installed in printing offices different from each other. The types and number of devices that are connected to the network 40 are not limited to the types and number illustrated in the example of FIG. 1.

Figure 2:
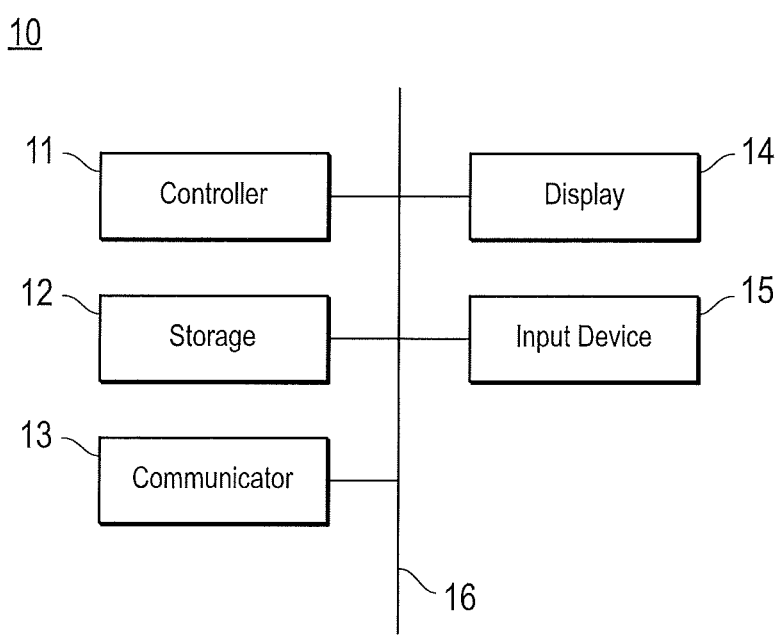
FIG. 2 is a block diagram schematically illustrating the configuration of a client terminal.

FIG. 2 is a block diagram schematically illustrating the configuration of the client terminal 10. The client terminal 10 includes a controller 11, a storage 12, a communicator 13, a display 14, and an input device 15. These components are mutually connected via a bus 16 that communicates a signal.

The controller 11 is a central processing unit (CPU), and the controller 11 controls the above respective components and performs various types of arithmetic processing according to a program.

The storage 12 is configured by a read-only memory (ROM) that stores in advance various programs and various types of data, a random access memory (RAM) that transitorily stores a program and data as a working area, a hard disk that stores various programs and various types of data, and the like. A printer driver that generates a print job is installed onto the storage 12.

The communicator 13 is an interface that performs communication with another device.

The display 14 is, for example, a liquid crystal display, and displays various types of information.

The input device 15 includes a pointing device such as a mouse and a keyboard, and is used to perform various inputs.

Figure 3:
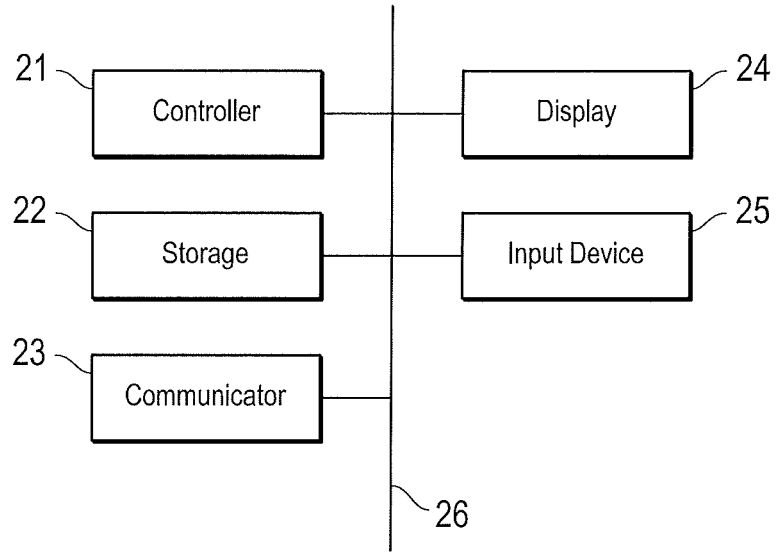
FIG. 3 is a block diagram schematically illustrating the configuration of a central management server.

FIG. 3 is a block diagram schematically illustrating the configuration of the central management server 20. The central management server 20 includes a controller 21, a storage 22, a communicator 23, a display 24, and an input device 25. These components are mutually connected via a bus 26 that communicates a signal. The above respective components of the central management server 20 have functions that are similar to those of the above respective components of the client terminal 10, and the description thereof will be omitted.

The controller 21 of the central management server 20 controls the plurality of image forming apparatuses 30 to execute the print job. The storage 22 of the central management server 20 stores a program for determining image forming apparatuses that are to be caused to execute the print job from among the plurality of image forming apparatuses 30, a program for generating a plurality of distributed print jobs from a single print job and transmitting the plurality of distributed print jobs to the respective image forming apparatuses, and other programs.

Figure 4:
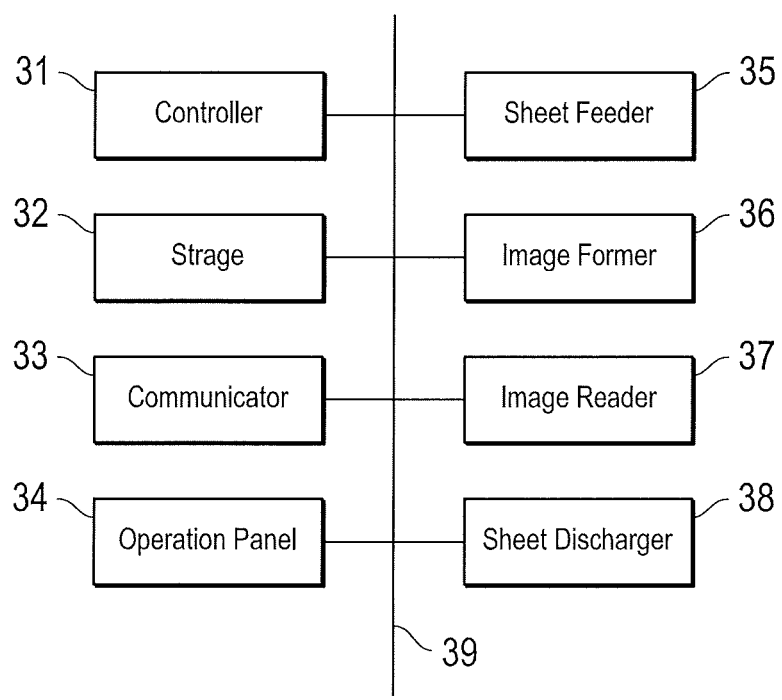
FIG. 4 is a block diagram schematically illustrating the configuration of an image forming apparatus.

FIG. 4 is a block diagram schematically illustrating the configuration of the image forming apparatus 30a. The image forming apparatuses 30a to 30d respectively have configurations that are similar to each other, and the image forming apparatus 30a is representatively described below.

The image forming apparatus 30a includes a controller 31, a storage 32, a communicator 33, an operation panel 34, a sheet feeder 35, an image former 36, an image reader 37, and a sheet discharger 38, and these components are mutually connected via a bus 39 that communicates a signal. From among the above respective components of the image forming apparatus 30a, the description of components having functions that are similar to those of the above respective components of the client terminal 10 will be omitted.

The operation panel 34 includes a touch panel, a numeric keypad, a start button, a stop button, and the like, and the operation panel 34 is used to display various types of information and to input various instructions.

The sheet feeder 35 stores sheets to be used in printing. The sheet feeder 35 includes a plurality of sheet feeding trays, and feeds one sheet that is stored in the sheet feeding tray at a time to the image former 36.

The image former 36 forms an image based on image data on the sheet using a well-known imaging process, such as the electrophotographic process, that includes respective steps of charging, exposure, developing, transferring, and fixing.

The image reader 37 digitalizes an image that the image former 36 has formed on the sheet. The image reader 37 applies light onto the sheet by using a light source such as a fluorescent lamp, performs photoelectric conversion on reflected light by using an imaging device such as a charge-coupled device (CCD) image sensor, and generates image data from an electrical signal thereof.

The sheet discharge 38 ejects paper on which an image has been formed by the image former 36. The sheet discharger 38 includes a plurality of sheet discharge trays, and the sheet discharger 38 discharges one sheet at a time onto a predetermined sheet discharge tray.

The controller 31 of the image forming apparatus 30a performs control to receive an order for the print job presented by the central management server 20 and to execute the print job. The storage 32 of the image forming apparatus 30a stores a program for determining whether an order for the print job is received, a program for requesting test image data from the central management server 20, a program for forming a test image and transmitting read image data to the central management server 20, and other programs.

Each of the client terminal 10, the central management server 20, and the image forming apparatuses 30a to 30d may include components other than the components described above, or some of the components described above may be omitted from each of the client terminal 10, the central management server 20, and the image forming apparatuses 30a to 30d.

In the image forming system 1 configured as described above, distributed print processing for executing the single print job using the plurality of image forming apparatuses 30 is performed. In order to improve the quality of printed matter, image forming apparatuses having a high color reproducibility are extracted from the plurality of image forming apparatuses 30, and the print job is executed by the extracted image forming apparatuses. The operation of the image faulting system 1 will be described in detail below with reference to FIG. 5 to FIG. 10.

First, the operation of the central management server 20 that causes the plurality of image forming apparatuses 30 to execute the print job will be described with reference to FIG. 5 and FIG. 6.

Figure 5:
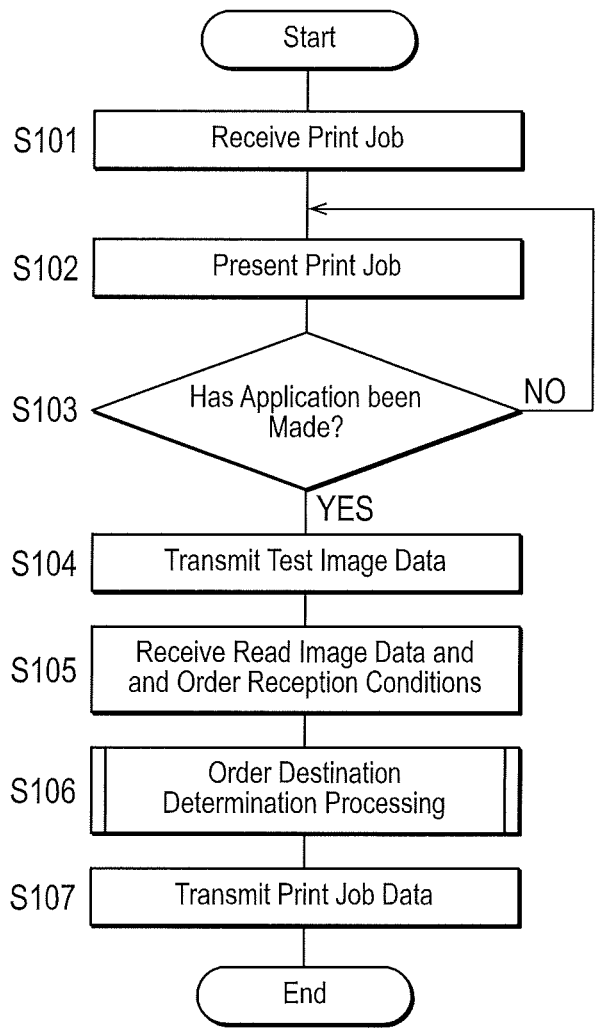
FIG. 5 is a flowchart illustrating the procedure of print job ordering processing.

FIG. 5 is a flowchart illustrating the procedure of print job ordering processing performed by the central management server 20.

First, the central management server 20 receives the print job from the client terminal 10 (step S101).

The central management server 20 presents information relating to the print job to image forming apparatuses 30 on the network 40 (step S102). In this embodiment, the central management server 20 presents, to the image forming apparatuses 30, information indicating the number of pages and an object attribute of the print job together with information relating to the delivery date of the print job, and seeks image forming apparatuses 30 that are able to execute the print job. Each of the image forming apparatuses 30 applies to become the image forming apparatus 30 that is to execute the print job in consideration of a job execution schedule and the like of the image forming apparatus.

The central management server 20 determines whether an image forming apparatus 30 on the network 40 has made an application (step S103). In this embodiment, when the central management server 20 receives a request for the test image data from an image forming apparatus 30, the central management server 20 determines that the image forming apparatus 30 has made the application.

When the central management server 20 determines that no image forming apparatuses 30 have made the application (step S103: NO), the processing of the central management server 20 returns to step S102.

When the central management server 20 determines that the image forming apparatus 30 has made the application (step S103: YES), the central management server 20 transmits the test image data to the image forming apparatus 30 that has made the application (step S104). In this embodiment, the central management server 20 transmits, to the image forming apparatus 30, image data of a color test pattern including all of the colors to be used in the print job as the test image data. Upon receipt of the test image data, the image forming apparatus 30 forms the test image on the sheet on the basis of the test image data. The image forming apparatus 30 reads the test image printed on paper by using the image reader 37 so as to generate the read image data, and transmits, to the central management server 20, the generated the read image data together with the order reception conditions (the printable number of sheets) of the print job.

The central management server 20 receives the read image data of the test image and the order reception conditions of the print job from the image forming apparatus 30 (step S105). As an example, the central management server 20 receives the read image data and the order reception conditions from each of the plurality of image forming apparatuses 30 on the network 40.

The central management server 20 performs order destination determination processing for determining the image forming apparatus 30 that is to be caused to execute the print job (step S106).

Figure 6:
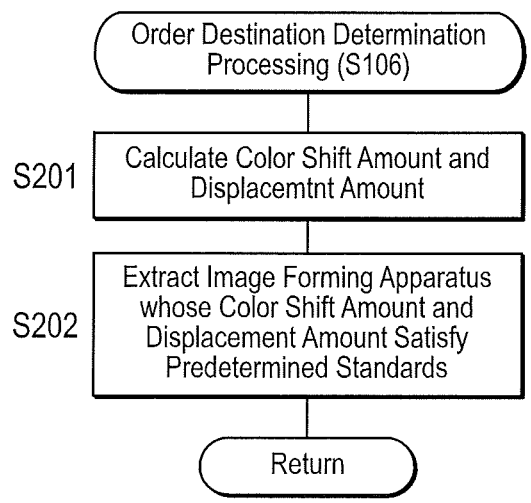
FIG. 6 is a flowchart illustrating the procedure of order destination determination processing.

FIG. 6 is a flowchart illustrating the procedure of order destination determination processing.

First, the central management server 20 compares the read image data received from each of the image forming apparatuses 30 with the test image data, and calculates both a color shift amount and a displacement amount of the test image (step S201). The color shift amount refers to a difference between the color of the test image printed by the image forming apparatus 30 and the color of the original test image. The displacement amount refers to a difference between the forming position of the test image formed by the image forming apparatus 30 and the forming position of the original test image. A technique for comparing two pieces of image data and calculating the color shift amount and the displacement amount of an image is a known art, and its detailed description will be omitted.

The central management server 20 extracts the image forming apparatus for which the color shift amount and the displacement amount of the test image satisfy predetermined standards as the image forming apparatus that is to be caused to execute the print job (step S202), and terminates the processing. To "satisfy the predetermined standard" means, for example, a case where the color shift amount or the displacement amount of the test image is smaller than or equal to a predetermined threshold or a case where the color shift amount or the displacement amount of the test image is within a predetermined range. The predetermined standards are set in advance for each print job in order to assure the quality of printed matter.

As described above, in the order destination determination processing of step S106, the central management server 20 determines the image forming apparatus 30 for which the color shift amount and the displacement amount of the test image satisfy predetermined standards to be the image forming apparatus that is to be caused to execute the print job.

When the image forming apparatus 30 is determined in the process of step S106, the central management server 20 transmits print job data to the image forming apparatus 30 that has been determined to be an order destination (step S107), and terminates the processing. In this embodiment, the central management server 20 generates a distributed print job according to the order reception conditions (the printable number of sheets) for each of the image forming apparatuses that have been determined to be order reception destinations preferentially from the image forming apparatus that has the smallest color shift amount. The central management server 20 transmits the print data of each of the distributed print jobs to a corresponding image forming apparatus 30, and causes the respective image forming apparatuses 30 to execute the print job.

As described above, in the processing of the flowchart illustrated in FIG. 5, the central management server 20 seeks the image forming apparatuses that are to execute the print job, and transmits the test image data to image forming apparatuses 30 that have applied to become the image forming apparatus that is to execute the print job. The central management server 20 receives the read image data of the test image from each of the image forming apparatuses 30, and determines the image forming apparatuses 30 serving as the order destinations of the print job on the basis of the read image data. The central management server 20 transmits the print job data to the image forming apparatuses 30 that have been determined to be order destinations, and causes the image forming apparatuses 30 to execute the print job.

The operation of the image forming apparatus 30 that executes the print job will be described next with reference to FIG. 7 and FIG. 8. The description below is made by using the image forming apparatus 30a as a representative.

Figure 7:
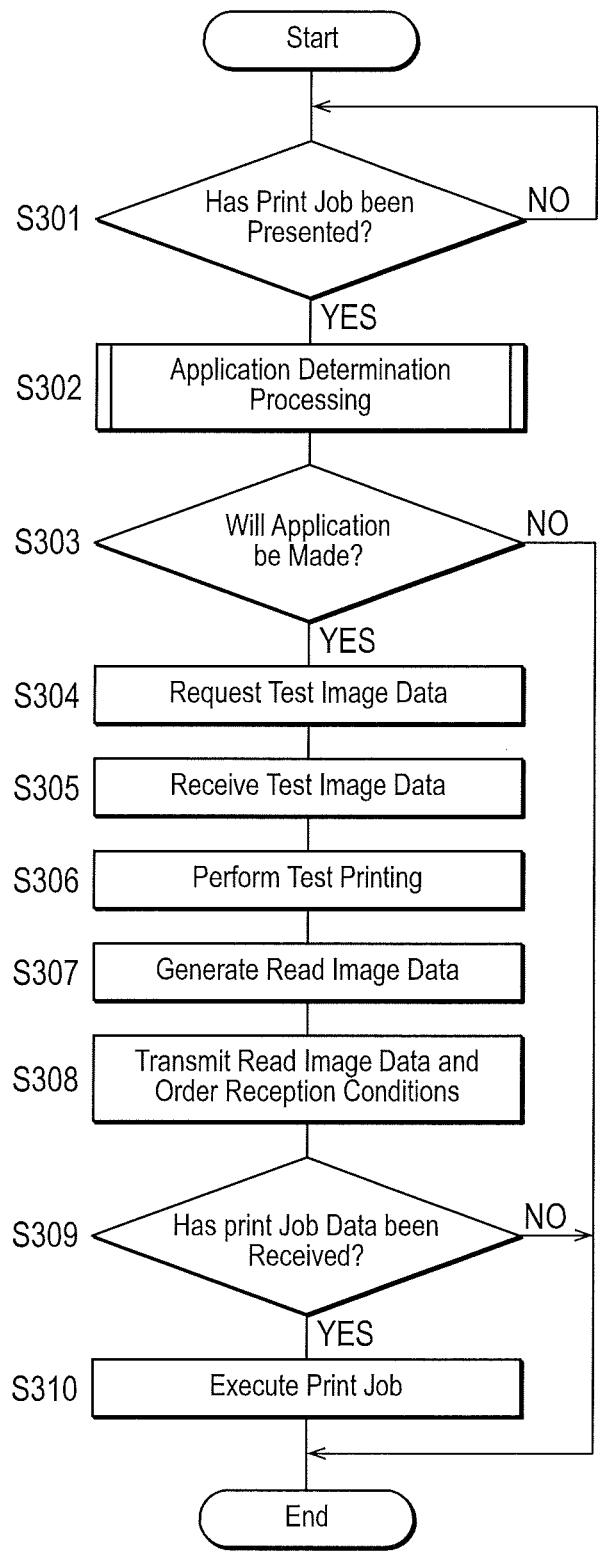
FIG. 7 is a flowchart illustrating the procedure of print job order reception processing.

FIG. 7 is a flowchart illustrating the procedure of print job order reception processing performed by the image forming apparatus 30a.

First, the image forming apparatus 30a determines whether the print job is presented by the central management server 20 (step S301). In this embodiment, the image forming apparatus 30a periodically determines, in a predetermined cycle, whether the print job is presented. Unlike this embodiment, the image forming apparatus 30a may determine whether a print job is presented only when an idle time period exists in the job execution schedule of the image forming apparatus itself.

When the image forming apparatus 30a determines that the print job has not been presented (step S301: NO), the image forming apparatus 30a waits until a print job is presented. When the image forming apparatus 30a determines that a print job is presented (step S301: YES), the image forming apparatus 30a performs application determination processing for determining whether the image forming apparatus 30a will make the application (step S302). The application determination processing will be described later.

The image forming apparatus 30a determines whether the image forming apparatus 30a will make the application in accordance with the determination result of the application determination processing (step S303). When the image forming apparatus 30a determines that the image foiling apparatus 30a will not make the application (step S303: NO), the image forming apparatus 30a terminates the processing.

When the image forming apparatus 30a determines that the image forming apparatus 30a will make the application (step S303: YES), the image forming apparatus 30a requests the test image data from the central management server 20 (step S304).

The image forming apparatus 30a receives the test image data from the central management server 20 (step S305).

The image forming apparatus 30a forms the test image on the sheet in accordance with the test image data (step S306).

The image forming apparatus 30a reads the test image formed on the sheet by using the image reader 37, and generates the read image data of the test image (step S307).

The image forming apparatus 30a transmits, to the central management server 20, the read image data of the test image together with the order reception conditions (the printable number of sheets) of the print job (step S308). The order reception conditions of the print job are calculated in the application determination processing of step S302.

The image forming apparatus 30a determines whether the print job data has been received (step S309). In this embodiment, when the central management server 20 determines that the image forming apparatus 30a is the order destination of the print job, the image forming apparatus 30a receives the print job data from the central management server 20.

When the image forming apparatus 30a determines that no print job data has been received (step S309: NO), the image forming apparatus 30a terminates the processing. When the image forming apparatus 30a determines that the print job data has been received (step S309: YES), the image forming apparatus 30a executes the print job (step S310), and terminates the processing.

As described above, in the processing of the flowchart illustrated in FIG. 7, when the image forming apparatuses that are to execute the print job have been sought, the image forming apparatus 30a determines whether the image forming apparatus 30a will make the application. When the image forming apparatus 30a makes the application, the image forming apparatus 30a receives the test image data from the central management server 20, and forms the test image. The image forming apparatus 30a reads the formed test image, and transmits the read image data to the central management server 20. When the image forming apparatus 30a is determined to be the order destination of the print job, the image forming apparatus 30a receives the print job data from the central management server 20, and executes the print job.

Application determination processing for determining whether the application is made to become the image forming apparatus that is to execute the print job will be described next in detail with reference to FIG. 8.

Figure 8:
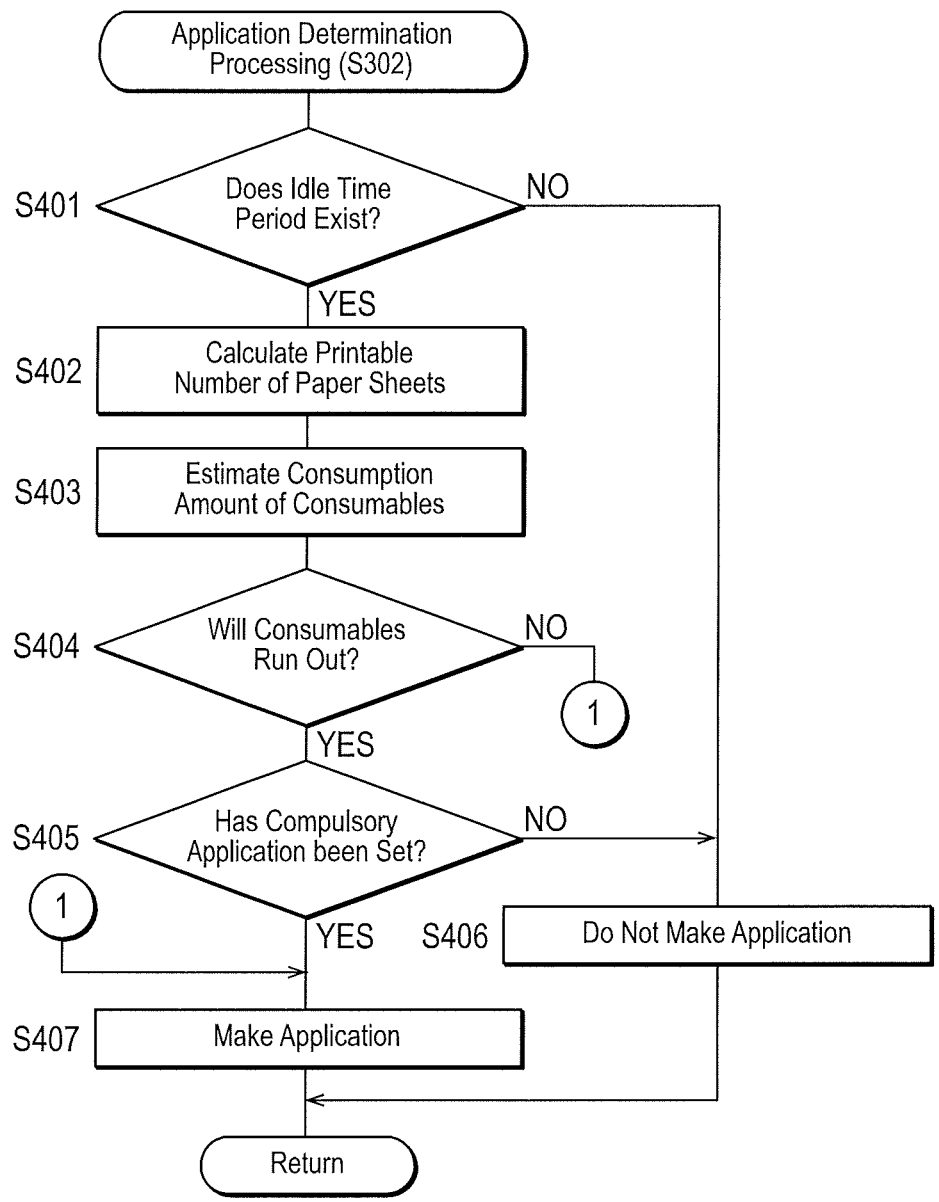
FIG. 8 is a flowchart illustrating the procedure of application determination processing.
Figure 9:
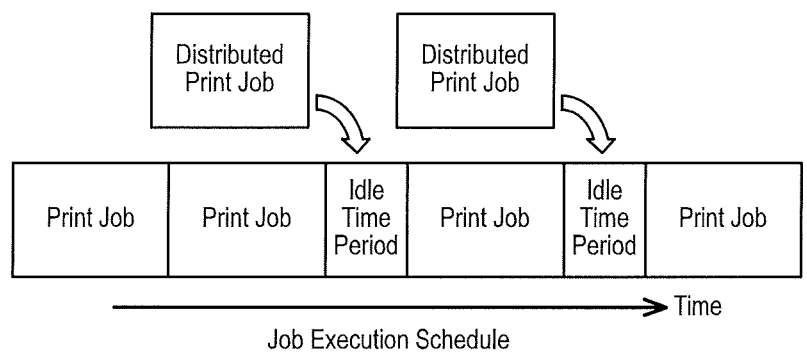
FIG. 9 is a diagram illustrating an example of the job execution schedule of the image forming apparatus.

FIG. 8 is a flowchart illustrating the procedure of the application determination processing of step S302 in FIG. 7.

First, the image forming apparatus 30a confirms the job execution schedule of the image forming apparatus itself, and determines whether an idle time period for executing the print job for which image forming apparatuses are sought exists (step S401). In this embodiment, the execution schedule of the print jobs that the image forming apparatus 30a has accepted is set in the image forming apparatus 30a (see FIG. 9). The image forming apparatus 30a refers to the job execution schedule of the image forming apparatus itself, and determines whether the idle time period during which the image forming apparatus 30a is able to execute the distributed print job exists before the delivery date presented by the central management server 20. At this time, the image forming apparatus 30a may refer to information relating to the delivery dates of currently accepted print jobs, may delay a time period for executing the print job that has enough time before its delivery date, and may secure the idle time period.

When the image forming apparatus 30a determines that no idle time periods exist (step S401: NO), the image forming apparatus 30a determines that the image forming apparatus 30a will not make the application (step S406), and terminates the processing.

When the image forming apparatus 30a determines that the idle time period exists (step S401: YES), the image forming apparatus 30a calculates the printable number of sheets by the image forming apparatus itself as the order reception conditions of the print job on the basis of information relating to the print job and the idle time period of the image forming apparatus itself (step S402). Unlike this embodiment, the printable number of sheets may be input by an operator.

The image forming apparatus 30a estimates a consumption amount of consumables in a case where currently accepted print jobs are executed (step S403).

The image forming apparatus 30a determines whether the consumables will run out when the currently accepted print jobs are executed (step S404).

When the image forming apparatus 30a determines that the consumables will not run out (step S404: NO), the image forming apparatus 30a determines that the image forming apparatus 30a will make the application (step S407), and terminates the processing.

When the image forming apparatus 30a determines that the consumables will run out (step S404: YES), the image forming apparatus 30a determines whether a compulsory application in which the application will be made regardless of whether the consumables will run out has been set in advance by the operator (step S405).

When the image forming apparatus 30a determines that the compulsory application has not been set (step S405: NO), the image forming apparatus 30a determines that the image forming apparatus 30a will not make the application (step S406), and terminates the processing.

When the image forming apparatus 30a determines that the compulsory application has been set (step S405: YES), the image forming apparatus 30a determines that the image forming apparatus 30a will make the application (step S407), and terminates the processing.

As described above, in the processing of the flowchart illustrated in FIG. 8, the image forming apparatus 30a determines whether the image forming apparatus 30a will make the application in consideration of the job execution schedule of the image forming apparatus and the situation of consumables. When the compulsory application is set, the image forming apparatus 30a may report to the operator that consumables will run out and may confirm whether the image forming apparatus 30a will receive an order for the print job, before the image forming apparatus 30a makes the application.

The operation of the image forming system 1 will be described next more specifically with reference to FIG. 10.

Figure 10:
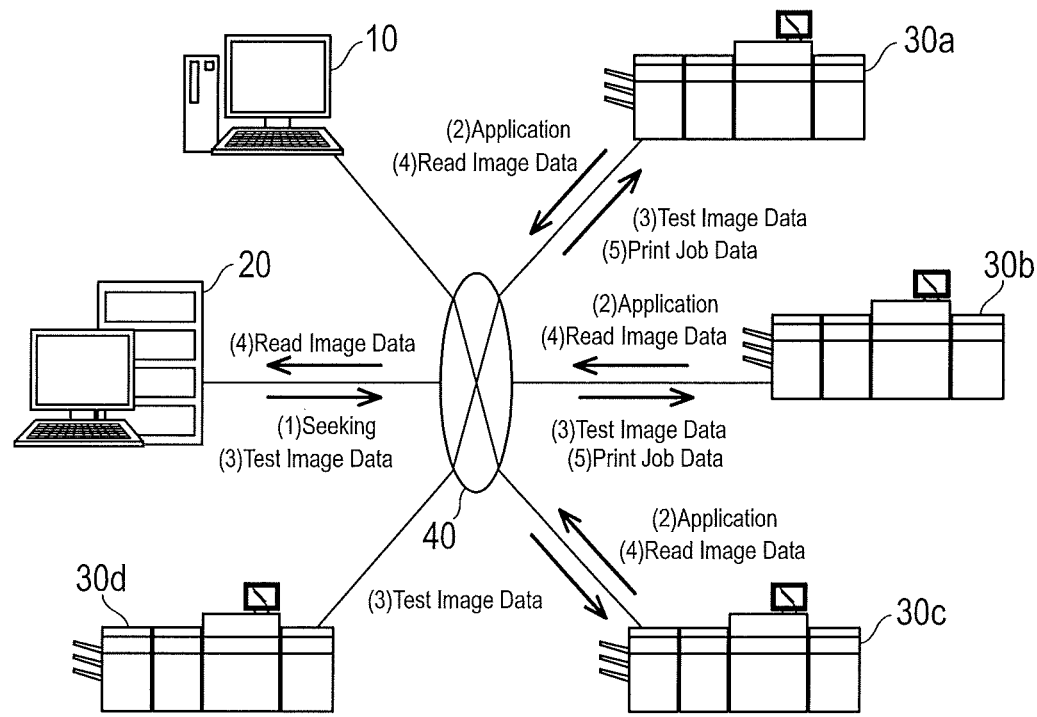
FIG. 10 is a diagram illustrating the flow of data between the central management server and the image forming apparatus.

FIG. 10 is a diagram explaining the flow of data between the central management server 20 and the image forming apparatuses 30.

First, the central management server 20 presents the print job to the image forming apparatuses 30a to 30d, and seeks image forming apparatuses 30 that are to execute the print job (see (1) in FIG. 10).

When the print job is presented to the image forming apparatuses 30a to 30d, each of the image forming apparatuses 30a to 30d considers the idle time period and the situation of consumables of the image forming apparatus themselves, and applies to become the image forming apparatus that is to execute the print job. As an example, the image forming apparatuses 30a to 30c, which have the idle time period, make the application (see (2) in FIG. 10). In contrast, the image forming apparatus 30d, which has no idle time period, does not make the application.

When the image forming apparatuses 30a to 30c make the application, the central management server 20 transmits test image data to the image forming apparatuses 30a to 30c (see (3) in FIG. 10).

Upon receipt of the test image data, each of the image forming apparatuses 30a to 30c forms the test image on the sheet on the basis of the test image data. Each of the image forming apparatuses 30a to 30c reads the test image formed on the sheet, and transmits the read image data to the central management server 20 (see (4) in FIG. 10).

The central management server 20 compares the read image data with the test image data, and determines, for example, the image forming apparatuses 30a and 30b for which the color shift amount of the test image satisfies a predetermined standard as the order destinations of the print job. The central management server 20 excludes the image forming apparatus 30c for which the color shift amount does not satisfy the predetermined standard from the order destinations of the print job. The central management server 20 transmits the print job data to the image forming apparatuses 30a and 30b, which have been determined to be the order destinations (see (5) in FIG. 10), and causes the image forming apparatuses 30a and 30b to execute the print job.

As described above, by employing the image forming system 1 according to this embodiment, the image forming apparatuses that are to execute the print job are determined in accordance with information obtained by each of the image forming apparatuses 30 forming the test image. In the configuration described above, the image forming apparatuses 30 for which color reproducibility has been assured can be selectively caused to execute the print job. Accordingly, when the plurality of image forming apparatuses 30 execute the print job, the printed matter with the quality of color reproducibility assured can be obtained without performing color calibration on the image forming apparatuses 30. Stated another way, the image forming system 1 that has both a high color reproducibility and a high productivity is implemented.

In addition, by employing the image forming system 1 according to this embodiment, each of the image forming apparatuses 30 can receive an order for the print job requiring the high color reproducibility during an idle time period of the image forming apparatus itself.

In the embodiment described above, when the print job data is transmitted to the image forming apparatuses that have been determined to be the order destinations of the print job, the central management server 20 preferentially generates the distributed print job for the image forming apparatus having a smaller color shift amount. However, the central management server 20 may preferentially generate the distributed print job for the image forming apparatus that has been used for another print job. By employing such a configuration, the printed matter of the current print job can be collected from the image forming apparatus 30 installed in a printing office at the same time as the printed matter of another print job is collected, and this enables printed matter to be efficiently collected.

In the embodiment described above, after the read image data of the test image is generated by the image forming apparatus 30, the read image data is transmitted to the central management server 20 with no change. However, test information to be transmitted from the image forming apparatus 30 to the central management server 20 is not limited to the read image data, and only color information, such as RGB values, that is extracted from the read image data may be transmitted to the central management server 20. In addition, the color test pattern does not need to include all of the colors to be used in a print job, and as an example, the color test pattern may only include a predetermined number of frequently used colors among the colors to be used in the print job.

In the embodiment described above, the image forming apparatus 30a calculates the printable number of sheets of the image forming apparatus in accordance with the idle time period of the image forming apparatus itself. However, the image forming apparatus 30a may further consider the consumption amount of consumables that is estimated in a case where the currently accepted print jobs are executed, and may calculate the printable number of sheets in such a way that the consumables will not run out even when the currently accepted print jobs are executed.

Second Embodiment

A second embodiment of the present invention will be described next with reference to FIG. 11. This embodiment is an embodiment in a case where image forming apparatuses that perform the distributed print processing may be insufficient.

Figure 11:
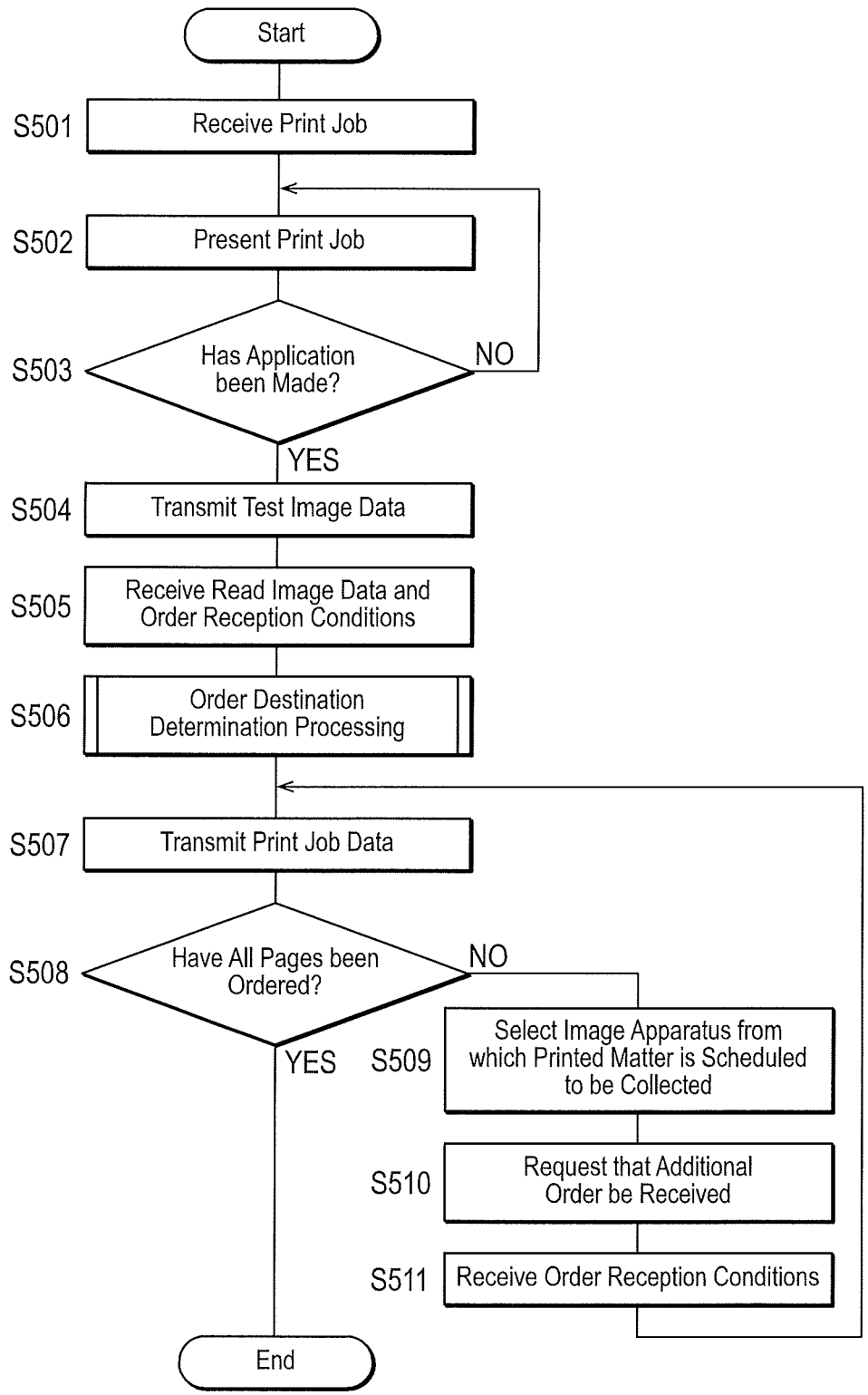
FIG. 11 is a flowchart illustrating the procedure of print job ordering processing according to a second embodiment of the present invention.

FIG. 11 is a flowchart illustrating the procedure of the print job ordering processing according to the second embodiment of the present invention. The configuration of the image forming system 1 according to this embodiment is similar to the configuration according to the first embodiment, and the description of the configuration of the image forming system 1 will be omitted.

The processes of steps S501 to S507 are similar to the processes of steps S101 to S107 in FIG. 5, and the description thereof will be omitted.

When the print job data is transmitted to the image forming apparatus 30 in the process of step S507, the central management server 20 determines whether all of the pages of the print job have been ordered (step S508). When the central management server 20 determines that all of the pages of the print job have been ordered (step S508: YES), the central management server 20 terminates the processing.

When the central management server 20 determines that not all of the pages of the print job have been ordered (step S508: NO), the central management server 20 selects the image forming apparatus 30 from which printed matter is scheduled to be collected from among the image forming apparatuses that have been determined to be order destinations in the process of step S506 (step S509). In this embodiment, the central management server 20 selects the image forming apparatus from which the printed matter of the current print job has not yet been collected or an image forming apparatus from which the printed matter of the current print job has already been collected but from which the printed matter of another print job is scheduled to be collected from among the image forming apparatuses that have been determined to be order destinations. A schedule of the collection of the printed matter is recognized by obtaining a job execution schedule or information indicating a situation of the collection of the printed matter from each of the image forming apparatuses.

The central management server 20 requests that the selected image forming apparatus 30 receive an additional order for the print job (step S510). The image feinting apparatus 30 that has been requested to receive the additional order for the print job performs the application determination processing illustrated in FIG. 8, and as an example, when the job execution schedule is changed such that the idle time period exists, the image forming apparatus 30 transmits, to the central management server 20, the order reception conditions (the printable number of sheets) of the print job. When the image forming apparatus 30 is requested to receive the additional order for the print job, the image forming apparatus 30 may report to the operator that the image forming apparatus 30 has been requested to receive the additional order for the print job, and may confirm whether the additional order will be received.

The central management server 20 receives the order reception conditions of the print job from the image forming apparatus 30 that has been requested to receive the additional order (step S511).

The central management server 20 generates the distributed print job according to the order reception conditions, and transmits the print job data to the corresponding image forming apparatus (step S507), and the processing moves on to the process of step S508. By doing this, the central management server 20 repeats the processes of steps S507 to S511 until all of the pages of the print job have been ordered.

As described above, in the processing of the flowchart illustrated in FIG. 11, when image forming apparatuses that are to execute the print job are insufficient, the central management server 20 requests that the image forming apparatus 30 for which the color shift amount and the displacement amount satisfy predetermined standards and from which printed matter is scheduled to be collected receive the additional order for the print job. By employing such a configuration, the print job can be reliably completed. In addition, an image forming apparatus 30 from which printed matter is scheduled to be collected is requested to receive an additional order, so that this enables printed matter to be efficiently collected.

In the embodiment described above, the image forming apparatus for which the color shift amount and the displacement amount satisfy the predetermined standards and from which printed matter is scheduled to be collected is requested to receive the additional order for the print job. However, the image forming apparatus for which the color shift amount and the displacement amount satisfy the predetermined standards may be requested to receive the additional order for the print job regardless of the schedule of the collection of printed matter. When the image forming apparatus is made to additionally execute the print job but not all of the pages of the print job have been ordered, as an example, the image forming apparatus for which the color shift amount and the displacement amount do not satisfy the predetermined standards may be requested to receive the additional order for the print job.

Third Embodiment

A third embodiment of the present invention will be described next with reference to FIG. 12. This embodiment is an embodiment in a case where the type of the sheet designated in the print job is different from the type of the sheet on which the test image is formed.

Assume, for example, a case where "thick paper" is designated in the print job but thick paper is not stored in the sheet feeding tray of the image forming apparatus 30a. In this case, the image forming apparatus 30a forms the test image on woodfree paper stored in the sheet feeding tray. The image forming apparatus 30a reads the test image formed on the woodfree paper by using the image reader 37, and transmits the read image data of the test image to the central management server 20.

Figure 12:
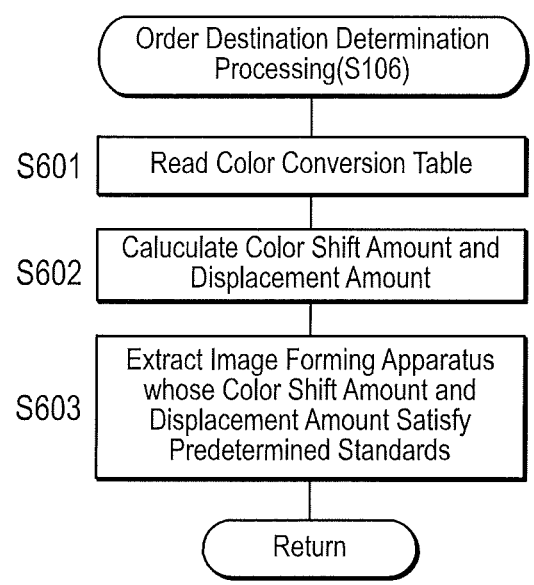
FIG. 12 is a flowchart illustrating the procedure of order destination determination processing according to a third embodiment of the present invention.

FIG. 12 is a flowchart illustrating the procedure of order destination determination processing according to the third embodiment of the present invention. The configuration of the image forming system 1 according to this embodiment is similar to the configuration according to the first embodiment, and the description of the configuration of the image forming system 1 will be omitted.

In the order destination determination processing according to this embodiment, the central management server 20 first reads a color conversion table set in the print job (step S601). The color conversion table is a relational expression for correcting a color difference between the color value of the test image printed on thick paper and the color value of the test image printed on woodfree paper, and the color conversion table is set in advance in the print job, for example, by a requester of the print job. Unlike this embodiment, the color conversion table may be registered in advance in the storage 22 of the central management server 20.

The central management server 20 applies the color conversion table so as to correct the color value of read image data, compares the read image data with the test image data, and calculates the color shift amount and the displacement amount of the test image (step S602).

The process of step S603 is similar to the process of step S202 in FIG. 6, and the description thereof will be omitted.

As described above, in the processing of the flowchart illustrated in FIG. 12, in the case where the test image is formed on the sheet for which the type is different from the type of the sheet designated in the print job, the central management server 20 corrects the color value by using a color conversion table, and calculates the color shift amount of the test image. By employing such the configuration, the image forming apparatuses that are to execute the print job can be sought from the image forming apparatuses 30 in which the sheet designated in the print job has not been set in the sheet feeding tray.

In a case where the sheet designated in the print job has not been set in the sheet feeding tray of the image forming apparatus 30, the image forming apparatus 30 may report to the operator that the designated sheet has not been set, and may confirm whether an order for the print job will be received, before the image forming apparatus 30 forms the test image. Alternatively, the image forming apparatus 30 may report to the operator that the designated sheet has not been set, and may recommend that the operator exchange the sheet, before the image forming apparatus 30 prints the test image.

Fourth Embodiment

In the first to third embodiments described above, the read image data of the test image is transmitted from the image forming apparatus 30 to the central management server 20, and the central management server 20 calculates the color shift amount and the displacement amount of the test image. However, the image forming apparatus 30 may calculate the color shift amount and the displacement amount of the test image.

Figure 13:
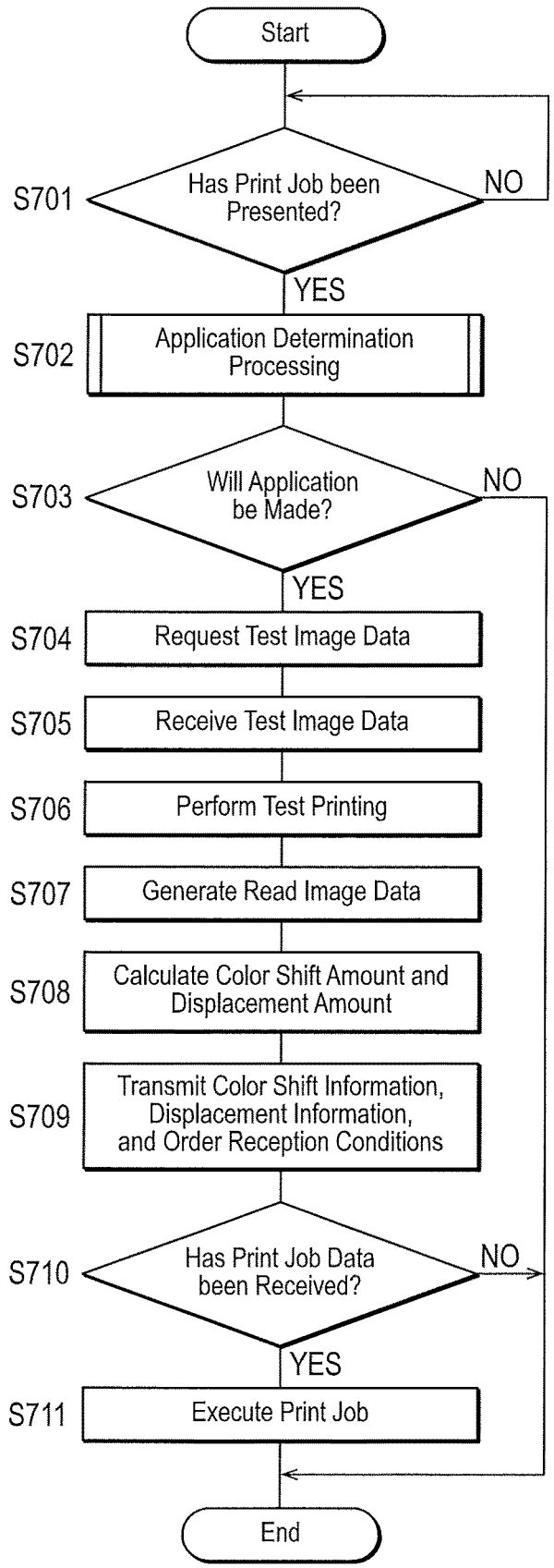
FIG. 13 is a flowchart illustrating the procedure of print job order reception processing according to a fourth embodiment of the present invention.

FIG. 13 is a flowchart illustrating the procedure of print job order reception processing according to a fourth embodiment of the present invention. The configuration of the image forming system 1 according to this embodiment is similar to the configuration according to the first embodiment, and the description of the configuration of the image forming system 1 will be omitted.

Steps S701 to S707 are similar to steps S301 to S307 in FIG. 7, and the description thereof will be omitted.

When the read image data of a test image is generated in the process of step S707, the image forming apparatus 30a compares the read image data with test image data, and calculates the color shift amount and the displacement amount of the test image (step S708).

The image framing apparatus 30a transmits, to the central management server 20, color shift information indicating the color shift amount and displacement information indicating the displacement amount together with the order reception conditions of the print job (step S709). The central management server 20 determines the image forming apparatus for which the color shift amount and the displacement amount that are indicated by the color shift information and the displacement information satisfy the predetermined standards to be the order destination of the print job, and transmits the print job data.

The processes of step S710 and the subsequent steps are similar to the processes of step S309 and the subsequent steps in FIG. 7, and the description thereof will be omitted.

As described above, in the processing of the flowchart illustrated in FIG. 13, after generating the read image data of the test image, the image forming apparatus 30a calculates the color shift amount and the displacement amount of the test image, and transmits information indicating the color shift amount and the displacement amount to the central management server 20. By employing such a configuration, the central management server 20 does not need to compare the read image data with the test image data and to calculate the color shift amount and the displacement amount, and a load on the central management server 20 can be reduced.

The present invention is not limited to the embodiments described above, and various modifications can be made within the scope of claims.

As an example, in the first to fourth embodiments described above, the image forming apparatus that is to be caused to execute the print job is determined according to the color shift amount and the displacement amount of the test image. However, the image forming apparatus that is to be caused to execute the print job may be only determined according to the color shift amount of the test image without considering the displacement amount of the test image.

In the first to fourth embodiments described above, the color test pattern including the colors to be used in the print job is used as the test image. However, the test image is not limited to the color test pattern, and may be the image of a specified page of the print job.

The first to fourth embodiments have been described above by using, as the example, the case where the plurality of image forming apparatuses that are installed in the different printing offices perform in distributed print processing. However, the image forming system according to the present invention can be applied to a case where the plurality of image forming apparatuses that are installed in the same printing office or in a single office perform the distributed print processing in addition to the case where the plurality of image forming apparatuses that are installed in the different printing offices perform the distributed print processing.

The first to fourth embodiments have been described above by using, as the example, the case where the plurality of image forming apparatuses are caused to execute the distributed print jobs obtained by dividing the single print job. However, the image forming system according to the present invention can be applied to a case where the plurality of image forming apparatuses are caused to execute a plurality of the print jobs that each have common image data in addition to the case where the plurality of the image forming apparatuses are caused to execute the distributed print jobs obtained by dividing the single print job.

Means and a method for performing respective types of processing in the image forming systems according to the first to fourth embodiments described above can be implemented by any of a dedicated hardware circuit and a programmed computer. The program described above may be provided by a computer-readable recording medium such as a compact disc read-only memory (CD-ROM), or may be provided online via a network such as the Internet. In this case, the program recorded in the computer-readable recording medium is normally transferred to a storage such as a hard disk and is stored in the storage. The program described above may be provided as independent application software, or may be incorporated into the software of the image forming apparatus as a single function of the image forming system.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming system comprising:
   a server that transmits, to a plurality of image forming apparatuses, a print job; and
   a plurality of image forming apparatuses that are connected to said server via a network and that receive said print job from said server, wherein
   an image forming apparatus, of the plurality of image forming apparatuses, forms a test image in accordance with test image data, reads, using an image reader of the image forming apparatus, said formed test image to generate test information representing said formed test image, and transmits said test information to said server, and
   said server receives said test information from said image forming apparatus, and determines one or more of the plurality of image forming apparatuses that are to be caused to execute said print job in accordance with said test information,
   wherein said server determines an image forming apparatus for which color reproducibility of said formed test image satisfies a predetermined standard that has been set in advance to be an image forming apparatus that is to be caused to execute said print job.

2. The image forming system as claimed in claim 1, wherein
   said print job is a single print job that is divided into plural print jobs and is executed by said plurality of image forming apparatuses, or a plurality of print jobs that each includes common image data.

3. The image forming system as claimed in claim 1, wherein
   said test image is a color test pattern that includes colors to be used in a print job that is scheduled to be executed.

4. The image forming system as claimed in claim 1, wherein
   said test information includes RGB values of color obtained by digitalizing said test image formed by said image forming apparatus.

5. The image forming system as claimed in claim 1, wherein
   said test information includes information relating to color reproducibility obtained by digitalizing said test image formed by said image forming apparatuses and comparing with said test image data.

6. The image forming system as claimed in claim 5, wherein
   said information relating to said color reproducibility includes information relating to a color shift of said formed test image.

7. The image forming system as claimed in claim 1, wherein
   said server preferentially determines an image forming apparatus that has already been used in another print job to be said image forming apparatus that is to be caused to execute said print job.

8. The image forming system as claimed in claim 1, wherein
   said server sets a delivery date of said print job, and seeks an image forming apparatus that are to execute said print job.

9. The image forming system as claimed in claim 1, wherein
   when said server seeks image forming apparatuses that are to execute said print job, said image forming apparatuses adjusts an execution schedule of print jobs in accordance with information relating to delivery dates of said print jobs that said image forming apparatus has accepted, and applies to become said image forming apparatus that is to execute said print job.

10. The image forming system as claimed in claim 1, wherein
    said image forming apparatus calculates a number of sheets that said image forming apparatus is able to print in accordance with an execution schedule of print jobs that said image forming apparatus has accepted, and transmits, to said server, information indicating said number of sheets as order reception conditions of said print job.

11. The image forming system as claimed in claim 10, wherein
    said image forming apparatuses determines said number of sheets in such a way that consumables do not run out in executing said print jobs that said image forming apparatus has accepted.

12. The image forming system as claimed in claim 1, wherein
    said image forming apparatuses is set to receive an order of said print job from said server even when runout of consumables is predicted.

13. The image forming system as claimed in claim 1, wherein
    when image forming apparatuses that have been determined to be image forming apparatuses that are to be caused to execute said print job are insufficient and said print job cannot be completed, said server requests that said image forming apparatuses that have been determined receive an additional order for said print job.

14. The image forming system as claimed in claim 13, wherein
    said server selectively requests that an image forming apparatus from which printed matter is scheduled to be collected receive said additional order.

15. The image forming system as claimed in claim 1, wherein
    information for correcting a color shift is set in said print job, said color shift being generated when said test image is formed on a sheet for which a type is different from a type of paper designated in said print job.

16. The image forming system as claimed in claim 1, wherein
    said test information includes information relating to a forming position of said test image.

17. A print job processing method that is applied to an image forming system that includes a server that transmits to, a plurality of image forming apparatuses, a print job, and a plurality of image forming apparatuses that are connected to said server via a network and that receive said print job from said server, said print job processing method comprising:
(a) forming, by each of said plurality of image forming apparatuses, a test image in accordance with test image data, reading, using an image reader of the respective image forming apparatus, said formed test image to generate test information representing said formed test image, and transmitting said test information to said server; and
(b) receiving, by said server, said test information from said image forming apparatuses, and determining one or more of the plurality of image forming apparatuses that are to be caused to execute said print job in accordance with said test information,
wherein said server determines an image forming apparatus for which color reproducibility of said formed test image satisfies a predetermined standard that has been set in advance to be an image forming apparatus that is to be caused to execute said print job.

18. A server that is used in an image forming system that includes said server that transmits to, a plurality of image forming apparatuses, a print job, and a plurality of image forming apparatuses that are connected to said server via a network and that receive said print job from said server, wherein
each of said image forming apparatuses forms a test image in accordance with test image data, reads, using an image reader of the respective image forming apparatus, said formed test image to generate test information representing said formed test image, and transmits said test information to said server, and
said server receives said test information from said image forming apparatuses, and determines image forming apparatuses that are to be caused to execute said print job in accordance with said test information,
wherein said server determines an image forming apparatus for which color reproducibility of said formed test image satisfies a predetermined standard that has been set in advance to be an image forming apparatus that is to be caused to execute said print job.

19. An image forming system comprising:
a server that transmits, to a plurality of image forming apparatuses, a print job; and
a plurality of image forming apparatuses that are connected to said server via a network and that receive said print job from said server, wherein
an image forming apparatus, of the plurality of image forming apparatuses, forms a test image in accordance with test image data, reads, using an image reader of the image forming apparatus, said formed test image to generate test information representing said formed test image, and transmits said test information to said server, wherein said test information includes RGB values of color obtained by digitalizing said test image formed by said image forming apparatus, and
said server receives said test information from said image forming apparatus, and determines one or more of the plurality of image forming apparatuses that are to be caused to execute said print job in accordance with said test information.

20. A print job processing method that is applied to an image forming system that includes a server that transmits to, a plurality of image forming apparatuses, a print job, and a plurality of image forming apparatuses that are connected to said server via a network and that receive said print job from said server, said print job processing method comprising:
(a) forming, by each of said plurality of image forming apparatuses, a test image in accordance with test image data, reading, using an image reader of the respective image forming apparatus, said formed test image to generate test information representing said formed test image, and transmitting said test information to said server, wherein said test information includes RGB values of color obtained by digitalizing said test image formed by said image forming apparatus; and
(b) receiving, by said server, said test information from said image forming apparatuses, and determining one or more of the plurality of image forming apparatuses that are to be caused to execute said print job in accordance with said test information.

21. A server that is used in an image forming system that includes said server that transmits to, a plurality of image forming apparatuses, a print job, and a plurality of image forming apparatuses that are connected to said server via a network and that receive said print job from said server, wherein
each of said image forming apparatuses forms a test image in accordance with test image data, reads, using an image reader of the respective image forming apparatus, said formed test image to generate test information representing said formed test image, and transmits said test information to said server, wherein said test information includes RGB values of color obtained by digitalizing said test image formed by said image forming apparatus, and
said server receives said test information from said image forming apparatuses, and determines image forming apparatuses that are to be caused to execute said print job in accordance with said test information.

* * * * *